United States Patent
Uchida

(10) Patent No.: US 12,323,005 B2
(45) Date of Patent: Jun. 3, 2025

(54) ROTOR AND METHOD FOR MANUFACTURING ROTOR

(71) Applicant: DENSO CORPORATION, Kariya (JP)

(72) Inventor: Toshihiro Uchida, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/647,600

(22) Filed: Apr. 26, 2024

(65) Prior Publication Data

US 2024/0297540 A1 Sep. 5, 2024

Related U.S. Application Data

(63) Continuation of application No. 17/426,818, filed as application No. PCT/JP2020/039280 on Oct. 19, 2020, now Pat. No. 11,996,738.

(30) Foreign Application Priority Data

Nov. 7, 2019 (JP) .................................. 2019-202189

(51) Int. Cl.
*H02K 1/276* (2022.01)

(52) U.S. Cl.
CPC ....... *H02K 1/2766* (2013.01); *H02K 2213/03* (2013.01)

(58) Field of Classification Search
CPC ........... H02K 15/0012; H02K 15/0081; H02K 15/03; H02K 1/30; H02K 1/2766; H02K 1/276

See application file for complete search history.

(56) References Cited

U.S. PATENT DOCUMENTS

| | | | |
|---|---|---|---|
| 2002/0041127 A1 | 4/2002 | Naito et al. | |
| 2003/0102755 A1 | 6/2003 | Naito et al. | |
| 2014/0102674 A1* | 4/2014 | Manz ................... | H02K 1/2773 29/598 |
| 2016/0359398 A1 | 12/2016 | Shibata | |

FOREIGN PATENT DOCUMENTS

| | | |
|---|---|---|
| JP | 2014-241705 A | 12/2014 |
| JP | 2016-184991 A | 10/2016 |
| JP | 2016-187283 A | 10/2016 |
| JP | 2017-005916 A | 1/2017 |

(Continued)

OTHER PUBLICATIONS

Dec. 22, 2020 International Search Report issued in International Patent Application No. PCT/JP2020/039280.

(Continued)

*Primary Examiner* — Bryan R Perez
(74) *Attorney, Agent, or Firm* — Oliff PLC

(57) ABSTRACT

A rotor includes a rotor core, including a magnet accommodation cavity, and a permanent magnet, embedded in the magnet accommodation cavity of the rotor core and including a bent portion located toward a radially inner side of the rotor core. The permanent magnet has a thickness to satisfy an expression of $0.0006D + 0.1626 - 0.5/(D/2) \leq$ $Wm/(D/2) \leq -0.0006D + 0.1626 + 0.5/(D/2)$.

2 Claims, 5 Drawing Sheets

(56) References Cited

FOREIGN PATENT DOCUMENTS

| | | |
|---|---|---|
| JP | 2017-55491 A | 3/2017 |
| JP | 2018-11376 A | 1/2018 |
| JP | 2018-085779 A | 5/2018 |
| JP | 6519294 B2 | 5/2019 |
| WO | 2018/198866 A1 | 11/2018 |

OTHER PUBLICATIONS

Oct. 12, 2023 U.S. Office Action issued U.S. Appl. No. 17/426,818.
Feb. 1, 2024 Notice of Allowance Issued U.S. Appl. No. 17/426,818.

* cited by examiner

<Present Embodiment: Torque Maximum>

<1st Aspect: Demagnetization Resistance Improved>

<2nd Aspect: Amount of Magnetic Material Used Reduced>

<Comparative Example>

ROTOR AND METHOD FOR MANUFACTURING ROTOR

CROSS-REFERENCE TO RELATED APPLICATIONS

This application is a continuation of U.S. application Ser. No. 17/426,818 filed on Jul. 29, 2021, which is a National Stage Entry application of PCT/JP2020/039280 filed on Oct. 19, 2020, which is based upon and claims the benefit of priority from prior Japanese Patent Application No. 2019-202189, filed on Nov. 7, 2019, the entire contents of which are incorporated herein by reference.

TECHNICAL FIELD

The present disclosure relates to an interior permanent motor (IPM) rotor and a method for manufacturing a rotor.

BACKGROUND ART

A rotating electrical machine that uses an interior permanent magnet rotor is known in the art. An interior permanent magnet rotor embeds permanent magnets in a rotor core to generate reluctance torque at portions of the rotor core located radially outward from the permanent magnet. There is a type of an interior permanent magnet rotor that uses permanent magnets having a bent continuous form, such as generally V-shaped or U-shaped permanent magnets, to enlarge the portions of the rotor core located radially outward from the permanent magnet and generate reluctance torque further effectively (for example, refer to patent document 1).

PRIOR ART DOCUMENT

Patent Document

Patent Document 1: Japanese Laid-Open Patent Publication No. 2018-85779

SUMMARY OF THE INVENTION

There is a need to adjust the output characteristics of a rotating electrical machine in a simple and appropriate manner. The inventors of the present invention have conducted studies on how to adjust the output characteristics of a rotating electrical machine by adjusting the dimensions of the rotor core and the permanent magnets in an interior permanent magnet rotor.

It is an objective of the present invention to provide a rotor that obtains preferred output characteristics and a method for manufacturing a rotor that easily obtains the preferred output characteristics.

In a first aspect of the present disclosure, a rotor (20) includes a rotor core (22), including a magnet accommodation cavity (24), and a permanent magnet (23), embedded in the magnet accommodation cavity of the rotor core and including a bent portion located toward a radially inner side of the rotor core. The permanent magnet that generates magnetic torque and an outer core portion (25) that generates reluctance torque and is located radially outward from the permanent magnet in the rotor core are formed to satisfy an expression of $-0.0006D+0.1626-0.5/(D/2) \leq Wm/(D/2) \leq -0.0006D+0.1626+0.5/(D/2)$, where Wm represents a thickness of the permanent magnet, and D/2 represents a radius of the rotor core.

With the above aspect, the permanent magnet of the rotor is embedded in the magnet accommodation cavity of the rotor core and includes the bent portion, which is located toward the radially inner side of the rotor core. The permanent magnet is formed so that the thickness satisfies the above expression. This allows sufficient magnetic torque to be generated.

In a second aspect of the present disclosure, a rotor (20) includes a rotor core (22) including a magnet accommodation cavity (24) and a permanent magnet (23) embedded in the magnet accommodation cavity of the rotor core and including a bent portion located toward a radially inner side of the rotor core. The permanent magnet that generates magnetic torque and an outer core portion that generates reluctance torque and is located radially outward from the permanent magnet in the rotor core are formed to satisfy an expression of $0.0148D+0.6919-19.87/\pi D \leq Sm/(\pi DL/2P) \leq 0.0148D+0.6919+19.87/\pi D$, where Sm represents a surface area of a portion of the permanent magnet opposing the outer core portion, D represents a diameter of the rotor core, L represents an axial length of the rotor core, and P represents a number of pole pairs of the rotor.

With the above aspect, the permanent magnet of the rotor is embedded in the magnet accommodation cavity of the rotor core and includes the bent portion, which is located toward the radially inner side of the rotor core. The permanent magnet is formed so that the surface area of the portion of the permanent magnet opposing the outer core portion satisfies the above expression. This allows sufficient magnetic torque to be generated.

A third aspect of the present disclosure is a method for manufacturing a rotor (20). The rotor (20) includes a rotor core (22) having a magnet accommodation cavity (24) and a permanent magnet (23) embedded in the magnet accommodation cavity of the rotor core and having a bent portion located toward a radially inner side of the rotor core. The permanent magnet generates magnetic torque, and an outer core portion (25) generates reluctance torque and is located radially outward from the permanent magnet in the rotor core. The method includes filling the magnet accommodation cavity of the rotor core with a magnetic material of the permanent magnet and magnetizing the permanent magnet that has been solidified so that a thickness of the permanent magnet is set to satisfy an expression of $-0.0006D+0.1626-0.5/(D/2) \leq Wm/(D/2) \leq -0.0006D+0.1626+0.5/(D/2)$, where Wm represents the thickness of the permanent magnet, and D/2 represents a radius of the rotor core.

With the above aspect, the permanent magnet of the rotor is embedded in the magnet accommodation cavity of the rotor core and includes the bent portion, which is located toward the radially inner side of the rotor core. The permanent magnet is formed so that the thickness satisfies the above expression. This allows for the manufacture of a rotor that generates sufficient magnetic torque.

A fourth aspect of the present disclosure is a method for manufacturing a rotor (20). The rotor (20) includes a rotor core (22) having a magnet accommodation cavity (24) and a permanent magnet (23) embedded in the magnet accommodation cavity of the rotor core and having a bent portion located toward a radially inner side of the rotor core. The rotor generates magnetic torque with the permanent magnet and reluctance torque with an outer core portion (25) located radially outward from the permanent magnet in the rotor core. The method includes filling the magnet accommodation cavity of the rotor core with a magnetic material of the permanent magnet and magnetizing the permanent magnet that has been solidified so that a surface area of the permanent magnet is set to satisfy an expression of $0.0148D+0.6919-19.87/\pi D \leq Sm/(\pi DL/2P) \leq 0.0148D+0.6919+19.87/\pi D$, where Sm represents the surface area of a portion of the permanent magnet opposing the outer core portion, D represents a diameter of the rotor core, L represents an axial length of the rotor core, and P represents a number of pole pairs of the rotor.

With the above aspect, the permanent magnet of the rotor is embedded in the magnet accommodation cavity of the rotor core and includes the bent portion, which is located toward the radially inner side of the rotor core. The permanent magnet is formed so that the surface area of a portion of the permanent magnet opposing the outer core portion satisfies the above expression. This allows for the manufacture of a rotor that generates sufficient magnetic torque.

BRIEF DESCRIPTION OF THE DRAWINGS

The present disclosure, together with objects and advantages thereof, may best be understood by reference to the following description of the presently preferred embodiments together with the accompanying drawings.

MODES FOR CARRYING OUT THE INVENTION

One embodiment of a rotor and a method for manufacturing a rotor will now be described.

Figure 1:
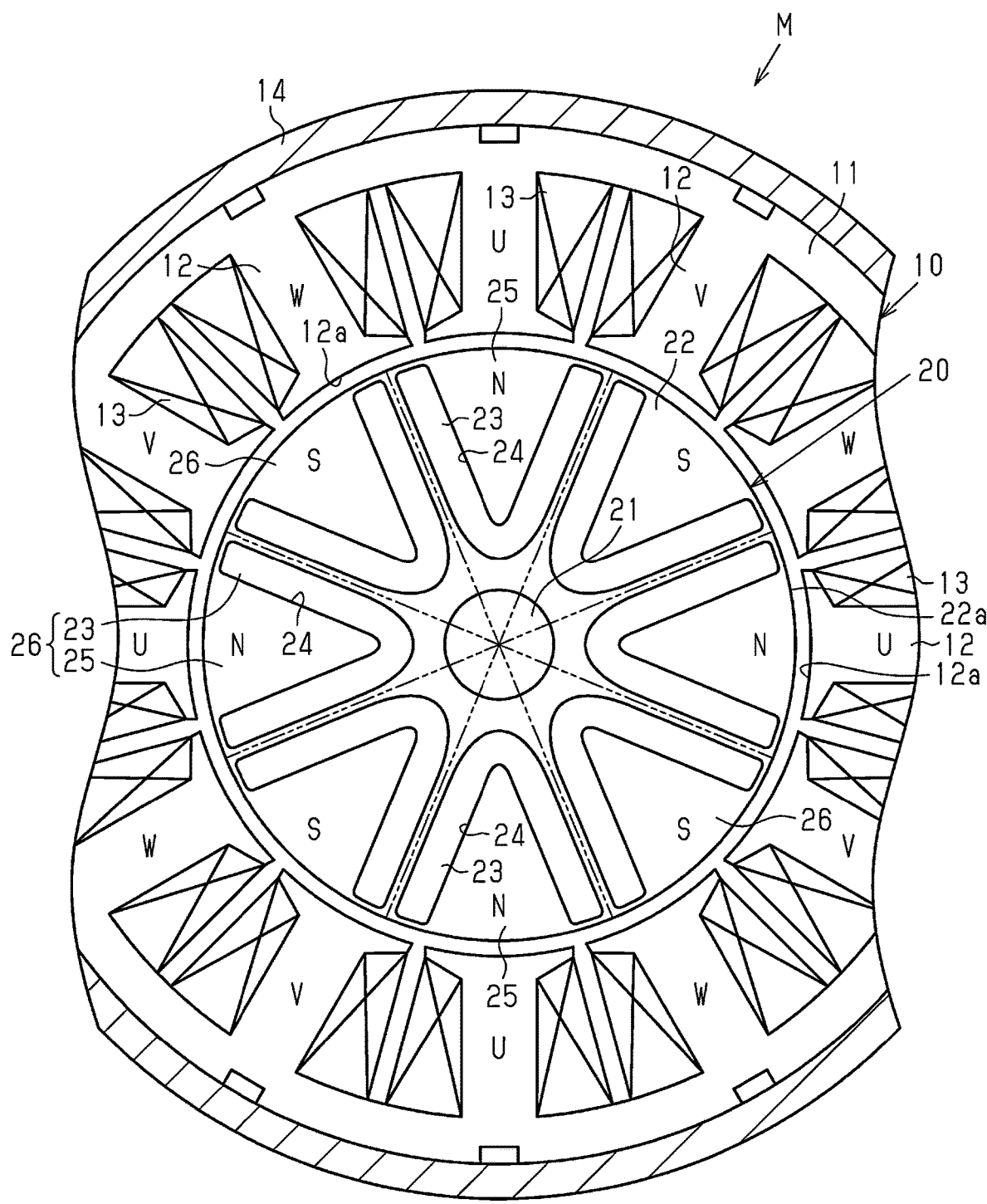
FIG. 1 is a diagram of an IPM rotating electrical machine.

FIG. 1 shows a rotating electrical machine M in accordance with the present embodiment that is a brushless motor of an interior permanent magnet type. The rotating electrical machine M includes a substantially ring-shaped stator 10 and a substantially cylindrical rotor 20 that is rotatably arranged in an open space extending radially inward from the stator 10.

The stator 10 includes a substantially ring-shaped stator core 11. The stator core 11 is formed from a magnetic metal material by, for example, stacking magnetic steel plates in the axial direction. The stator core 11 includes a plurality of (twelve in the present embodiment) teeth 12. The teeth 12 are identical in shape. Each tooth 12 has a substantially T-shaped distal end, or radially inner end, where an arcuate distal end surface 12a extends in correspondence with the outer circumferential surface of the rotor 20. Coils 13 are wound around the teeth 12 in a concentrated manner. The coils 13 are connected in three phases. In the example shown in FIG. 1, the coils 13, wound around the teeth 12, each function as a U-phase, a V-phase, or a W-phase. When the coils 13 are supplied with power, a rotating magnetic field that rotates the rotor 20 is generated at the stator 10. The outer circumferential surface of the stator core 11 of the stator 10 is fixed to an inner circumferential surface of a housing 14.

The rotor 20 includes a rotation shaft 21, a generally cylindrical rotor core 22 including a central portion into which the rotation shaft 21 is fitted, and a plurality of (eight in the present embodiment) permanent magnets 23 embedded in the rotor core 22. The rotor core 22 is formed from a magnetic metal material by, for example, stacking magnetic steel plates in the axial direction. The rotation shaft 21 is supported by a bearing (not shown) in the housing 14 so that the rotor 20 is rotatable relative to the stator 10.

The rotor core 22 includes magnet accommodation cavities 24 that accommodate the permanent magnets 23. The magnet accommodation cavities 24 (eight in the present embodiment) are arranged at equal intervals in the circumferential direction of the rotor core 22. Each magnet accommodation cavity 24 is generally V-shaped and formed to extend continuously and have a bent portion located toward the radially inner side. The magnet accommodation cavities 24 are identical in shape.

The permanent magnets 23 of the present embodiment are bonded magnets formed by solidifying a magnetic material, which is a mixture of magnetic powder and resin, in a mold. More specifically, the permanent magnets 23 are formed by performing injection molding to fill the magnet accommodation cavities 24 of the rotor core 22, which serve as molds, with a pre-solidified magnetic material so that there are no voids in the magnet accommodation cavities 24 and then hardening the magnetic material in the magnet accommodation cavities 24. Thus, the magnet accommodation cavities 24 are shaped in conformance with the permanent magnets 23. The shapes of the magnet accommodation cavities 24 and the permanent magnets 23 will be described in detail later.

The magnetic powder used for the permanent magnets 23 in the present embodiment is, for example, samarium-iron-nitrogen (SmFeN) magnet but may be other rare earth magnets and the like. A magnetizing device (not shown) is used to magnetize the permanent magnets 23 solidified in the magnet accommodation cavities 24 of the rotor core 22 from the outer side of the rotor core 22. The permanent magnets 23 are magnetized so that the poles change alternately in the circumferential direction of the rotor core 22. Each permanent magnet 23 is magnetized in its thickness direction.

In the rotor core 22, the portion located radially outward from each permanent magnet 23, that is, the portion opposing the stator 10, functions as an outer core portion 25 that generates reluctance torque. The boundary between the outer core portion 25 and the corresponding permanent magnet 23 includes part of the corresponding magnet accommodation cavity 24. Thus, the shape of the boundary will be described in detail later together with the shape of the permanent magnet 23. The rotor 20 includes, for example, eight rotor magnetic poles 26 that include, for example, the eight permanent magnets 23 and the outer core portions 25 surrounded by the permanent magnets 23. As shown in FIG. 1, the rotor magnetic poles 26 function as N poles or S poles. Magnetic torque and reluctance torque are both generated by the rotor magnetic poles 26 in the rotor 20.

The shape of the permanent magnets 23 will now be described in detail.

Figure 2:
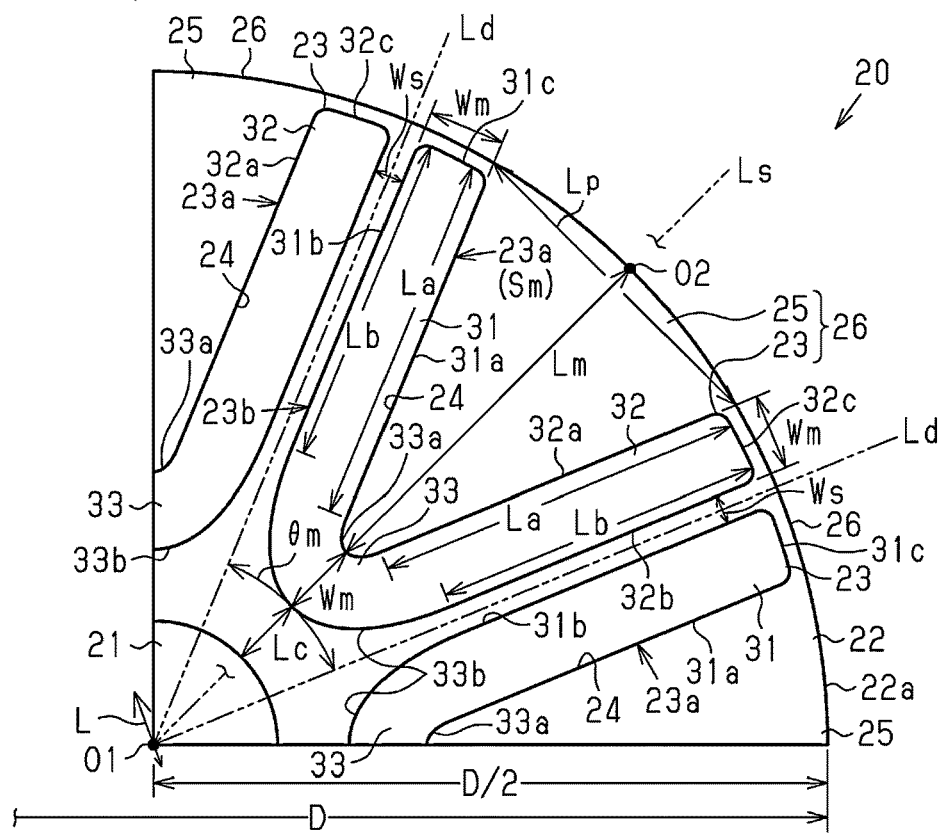
FIG. 2 is a diagram of a rotor in which permanent magnets are shaped to generate the maximum magnetic torque.

In an axial view of the rotor 20 shown in FIG. 2, each permanent magnet 23 is generally V-shaped and formed to extend continuously and have a bent portion located toward the radially inner side. The permanent magnet 23 is shaped to be line symmetrical with respect to a circumferentially central line Ls that extends through a center axis O1 of the rotor 20. Further, the permanent magnets 23 are extremely close to magnetic pole boundary lines Ld that extend through the center axis O1 of the rotor 20 and between adjacent ones of the rotor magnetic poles 26. The distance Ws between each permanent magnet 23 and the permanent magnet 23 of the adjacent rotor magnetic pole 26 is extremely small. The angle between two adjacent ones of the magnetic pole boundary lines Ld, that is, the pole open angle θm of the rotor magnetic poles 26, is 180° in electrical angle.

Each permanent magnet 23 includes a first straight portion 31 that is located at one side in the circumferential direction (e.g., counterclockwise side), a second straight portion 32 that is located at the other side in the circumferential direction (e.g., clockwise side), and a bent portion 33 that is bent and connects the radially inner ends of the first and second straight portions 31 and 32. The first straight portion 31 includes a first straight portion inner surface 31a opposing the outer core portion 25 at the inner side of the generally V-shaped form, a first straight portion outer surface 31b opposing the second straight portion 32 of the adjacent permanent magnet 23 in the circumferential direction, and a first straight portion end surface 31c that is the radially outer end surface. In the same manner as the first straight portion 31, the second straight portion 32 includes a second straight portion inner surface 32a opposing the outer core portion 25 at the inner side of the generally V-shaped form, a second straight portion outer surface 32b opposing the first straight portion 31 of the adjacent permanent magnet 23 in the circumferential direction, and a second straight portion end surface 32c that is the radially outer end surface. The bent portion 33 includes a bent portion inner surface 33a opposing the outer core portion 25 at the inner side of the generally V-shaped form and a bent portion outer surface 33b is directed toward the center of the rotor 20. In other words, the bent portion inner surface 33a opposes the stator 10, and the bent portion outer surface 33b opposes the rotation shaft 21.

In the first straight portion 31, the first straight portion inner surface 31a and the first straight portion outer surface 31b are parallel to each other and to the magnetic pole boundary line Ld. Thus, the first straight portion 31 extends parallel to the magnetic pole boundary line Ld, and the first straight portion 31 has a constant thickness Wm in the direction in which the straight portion 31 extends. Further, in the second straight portion 32, the second straight portion inner 32a and the second straight portion outer surface 32b are also parallel to each other and to the magnetic pole boundary line Ld. Thus, the second straight portion 32 also extends parallel to the magnetic pole boundary line Ld, and the second straight portion 32 has a constant thickness Wm in the direction in which the straight portion 32 extends. In the bent portion 33, the bent portion inner surface 33a and the bent portion outer surface 33b are parallel to each other, and the bent portion 33 has a constant thickness Wm in the direction in which the bent portion 33 extends. Thus, the thickness Wm of the permanent magnet 23 is constant throughout the V-shaped form.

The bent portion 33 is bent so that an intersecting point of the circumferentially central line Ls of the permanent magnet 23 and the outer circumferential surface 22a of the rotor core 22 is the center point O2 of an ellipse formed by part of the bent portion inner surface 33a and an ellipse formed by part of the bent portion outer surface 33b. Thus, in each of the first and second straight portions 31 and 32, the length Lb of each of the first and second straight portion outer surfaces 31b and 32b is shorter than the length La of each of the first and second straight portion inner surfaces 31a and 32a. The bent portion 33 does not have to be bent as described above. For example, the bent portion inner surface 33a and the bent portion outer surface 33b may be curved in a manner having different center points. Alternatively, the bent portion inner surface 33a and the bent portion outer surface 33b may each have the form of a true circle instead of an ellipse. The first straight portion inner surface 31a, the bent portion inner surface 33a, and the second straight portion inner surface 32a are continuous with one another and define an inner magnet surface 23a of the permanent magnet 23. The first straight portion outer surface 31b, the bent portion outer surface 33b, and the second straight portion outer surface 32b are continuous with one another and define an outer magnet surface 23b.

In the rotor magnetic pole 26 including the permanent magnet 23 and the outer core portion 25 between adjacent ones of the magnetic pole boundary line L, the part between the first and second straight portion inner surfaces 31a and 32a of the permanent magnet 23 is where the magnetic pole mainly functions. Accordingly, a magnetic pole pitch Lp is defined between points where lines extending from the first and second straight portion inner surfaces 31a and 32a intersect with the outer circumferential surface 22a of the rotor core 22. Further, the dimension along the circumferentially central line Ls of the permanent magnet 23 from the outer circumferential surface 22a of the rotor core 22 to the bent portion inner surface 33a of the permanent magnet 23 defines an embedment depth Lm. The permanent magnets 23 of the present embodiment have a bent shape and are relatively deep so that the embedment depth Lm is greater than the magnetic pole pitch Lp. Thus, $Lm/Lp \geq 1$ is satisfied. Further, the permanent magnets 23 of the present embodiment are each shaped so that the surface area Sm of the inner magnet surface 23a is relatively large as compared with a known surface permanent magnet (SPM) type that disposes permanent magnets on the outer circumferential surface of a rotor core. The magnet surface area in an SPM type corresponds to the surface area of the outer circumferential surface 22a of the rotor core 22 allocated for a single rotor magnetic pole 26. When D represents the diameter of the rotor 20 (rotor core 22), L represents the axial length of the rotor 20, and P represents the number of pole pairs of the rotor 20, $\pi DL/2P$ is obtained. A situation in which the surface area Sm of the inner magnet surface 23a of each permanent magnet 23 is greater than the magnet surface area of the SPM type can be expressed by $Sm/(\pi DL/2P) \geq 1$.

The inventors of the present invention have conducted studies on the correlation of the thickness Wm of the permanent magnet 23 and the surface area Sm of the inner magnet surface 23a of the permanent magnet 23 with respect to the magnetic torque that significantly improves the output characteristics of the rotating electrical machine M. The studies were conducted under the condition that the gap between adjacent ones of the permanent magnets 23, specifically, the distance Ws is constant between the first and second straight portion outer surfaces 31b and 32b of the adjacent and parallel first and second straight portions 31 and 32. Further, the embedment depth Lm of the permanent magnet 23 was maximized, specifically, the length Lc of the portion of the rotor core 22 between the rotation shaft 21 and the bent portion outer surface 33b of the bent portion 33 on the circumferentially central line Ls of the permanent magnets 23 was minimized to be about the same as the thickness Wm of the permanent magnet 23. Under these conditions, studies were conducted to find how the magnetic torque changes when varying the thickness Wm and surface area Sm of the permanent magnet 23.

Figure 3:
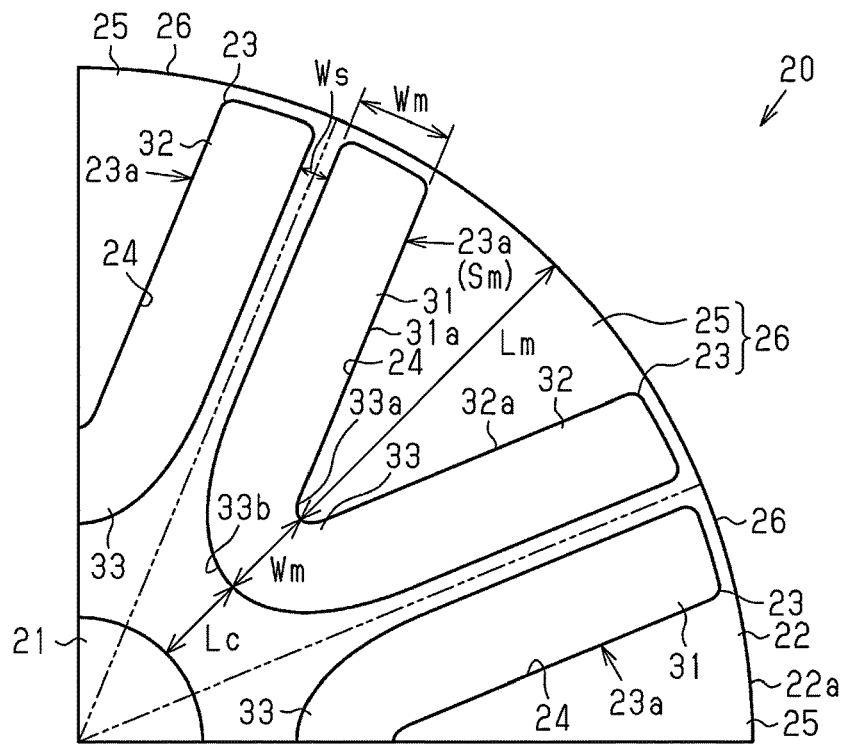
FIG. 3 is a diagram of a rotor in which permanent magnets are shaped to increase demagnetization resistance.
Figure 4:
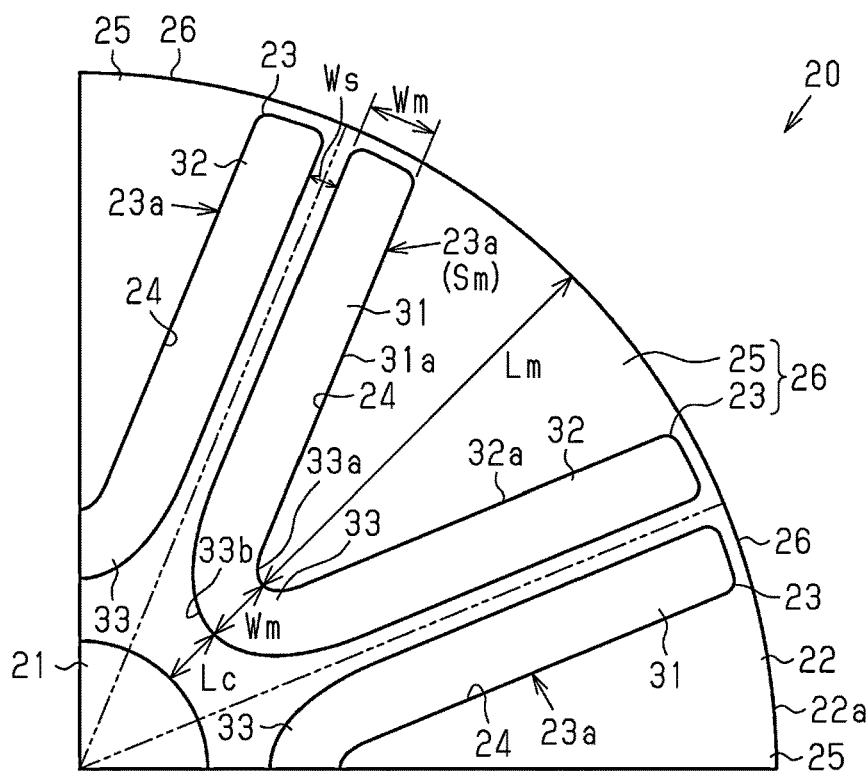
FIG. 4 is a diagram of a rotor in which permanent magnets are shaped to reduce the amount of magnetic material used.
Figure 5:
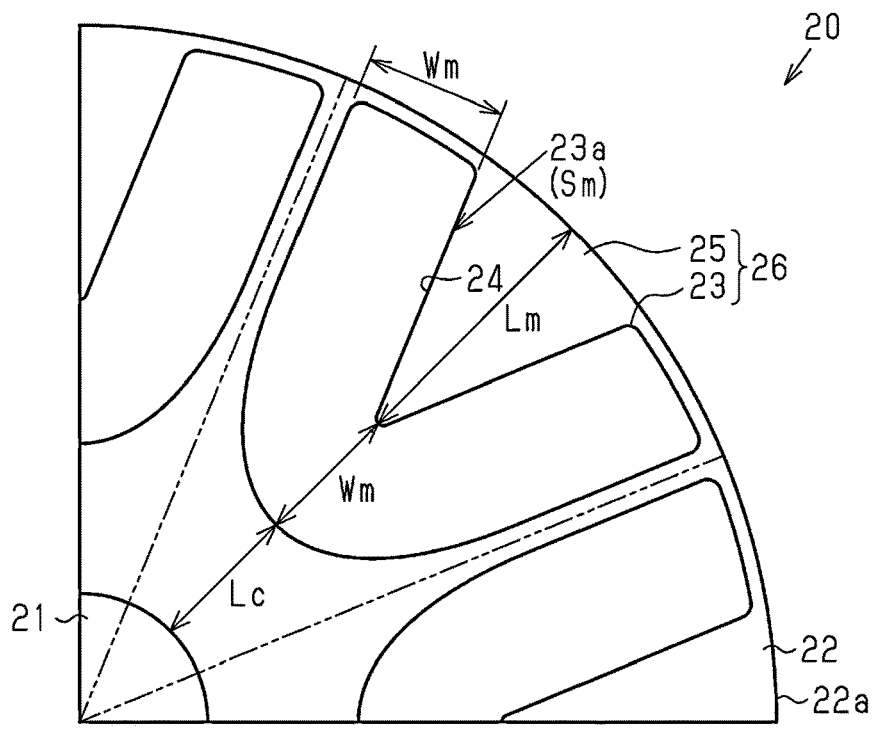
FIG. 5 is a diagram of a rotor showing the shape of permanent magnets in a modified example.

FIG. 2 shows the configuration of the permanent magnets 23 of the present embodiment. This is the configuration of the permanent magnets 23 that maximizes the magnetic torque. FIG. 3 shows the configuration of the permanent magnets 23 that increases the demagnetization resistance while generating sufficient magnetic torque. This configuration is a sufficiently effective mode (first aspect). FIG. 4 shows the configuration of the permanent magnets 23 that are shaped to reduce the amount of magnetic material used while generating sufficient magnetic torque. This configuration is a sufficiently effective mode (second aspect). In contrast, FIG. 5 shows the configuration of IPM permanent magnets 23 in a comparative example of which the output is slightly decreased from a known SPM type.

Figure 6:
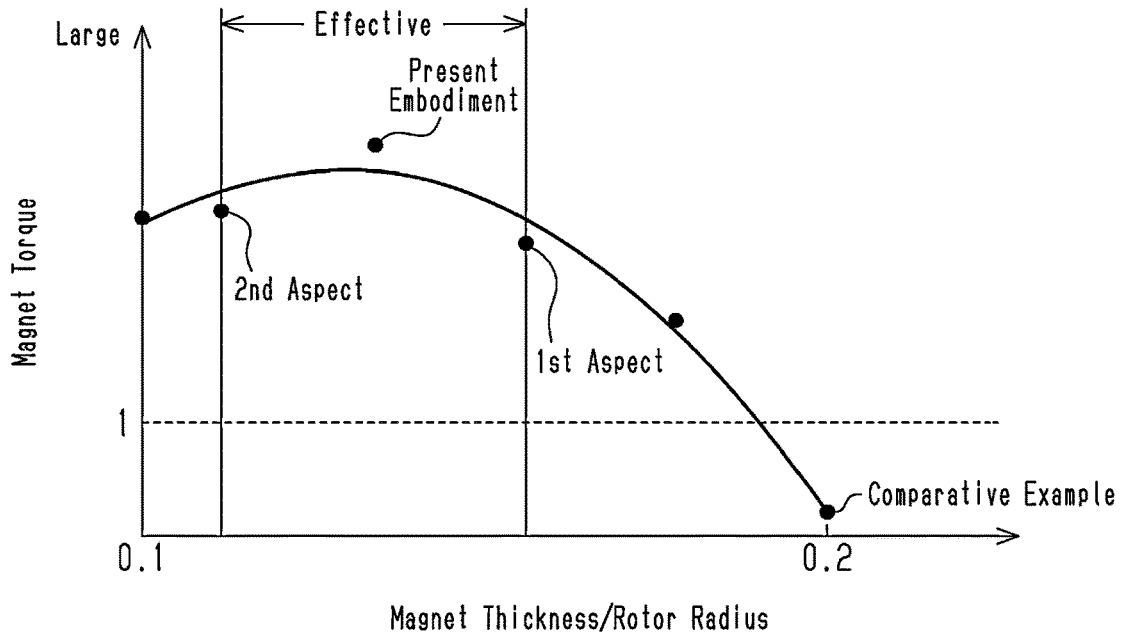
FIG. 6 is a graph showing the correlation of the permanent magnet thickness and the magnetic torque.
Figure 7:
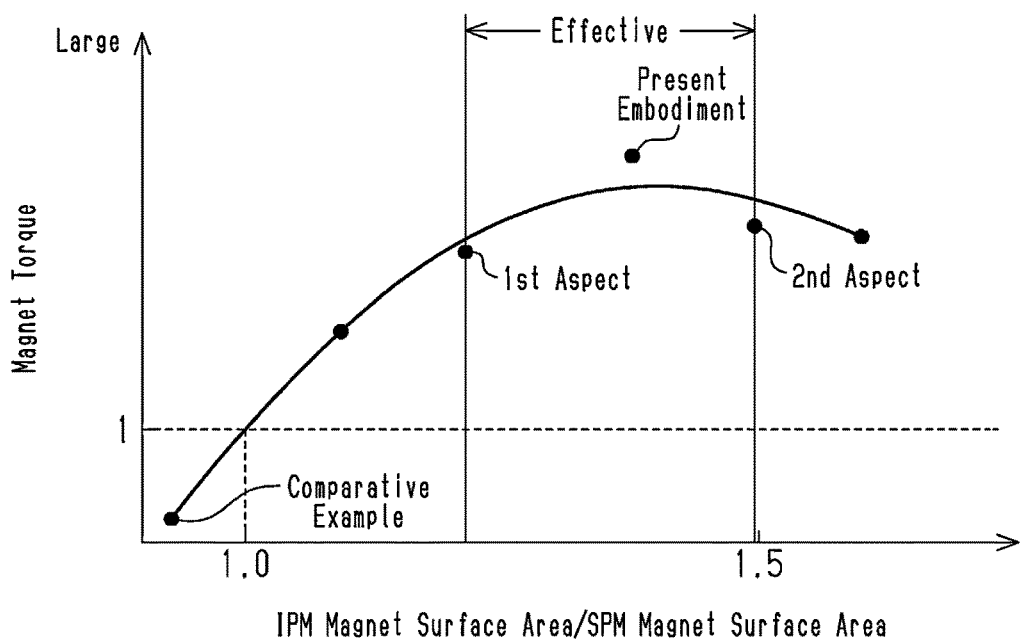
FIG. 7 is a graph showing the correlation of the permanent magnet surface area and the magnetic torque.

FIG. 6 shows the correlation of the thickness Wm of the permanent magnet 23 and the magnetic torque in the modes shown in FIGS. 2 to 5. In this case, the thickness Wm of the permanent magnet 23 is expressed as a ratio to the radius D/2 of the rotor core 22, where Wm/(D/2)≥0.1 was satisfied. The horizontal axial indicates the thickness Wm of the permanent magnet 23 (magnet thickness/rotor diameter), and the vertical axis indicates the magnetic torque. FIG. 7 shows the correlation of the surface area Sm of the permanent magnet 23 and the magnetic torque in the modes shown in FIGS. 2 to 5. In this case, the surface area Sm of the permanent magnet 23 is expressed as a ratio to the magnet surface area of the SPM type. The horizontal axis indicates the surface area Sm of the permanent magnet 23 (IPM magnet surface area/SPM magnet surface area), and the vertical axis indicates the magnetic torque. In FIG. 7, the magnetic torque is defined as "1" in a case where the IPM magnet surface area is equal to the SPM magnet surface area (i.e., IPM magnet surface area/SPM magnet surface area=1.0). The same value is defined as "1" for the magnetic torque in FIG. 6.

With the configuration of the permanent magnets 23 in the present embodiment shown in FIG. 2, the thickness Wm of the permanent magnet 23 in the graph of FIG. 6 is where the magnetic torque is the maximum value, and the surface area Sm in the graph of FIG. 7 is where the magnetic torque is the maximum value. The permanent magnets 23 included in the rotor of the present embodiment are set so that the thickness Wm and surface area Sm of each permanent magnet 23 substantially correspond to the point where the magnetic torque is the maximum. The thickness Wm and surface area Sm of the permanent magnet 23 are contradicting matters. As the thickness Wm of the permanent magnet 23 increases, the surface area Sm decreases. As the thickness Wm decreases, the surface area Sm increases. Thus, the thickness Wm and the surface area Sm have an inversely proportional relationship. Accordingly, studies may be conducted using only one or both of the thickness Wm and surface area Sm of the permanent magnet 23.

In the configuration of the permanent magnets 23 in the first aspect shown in FIG. 3, the thickness Wm is slightly greater and the surface area Sm is set to be slightly less than the permanent magnets 23 in the present embodiment shown in FIG. 2. FIGS. 6 and 7 show that the magnetic torque in the first aspect is slightly lower than the present embodiment shown in FIG. 2 but nevertheless high enough. In addition, in the first aspect, the thickness Wm of the permanent magnet 23 is slightly greater. Thus, the permanent magnets 23 of the first aspect has superior demagnetization resistance and increases the demagnetization resistance.

In the configuration of the permanent magnets 23 in the second aspect shown in FIG. 4, the thickness Wm is slightly less and the surface area Sm is slightly greater than the permanent magnets 23 of the present embodiment shown in FIG. 2. The graphs of FIGS. 6 and 7 indicate that the magnetic torque of the second aspect is slightly lower than the present embodiment shown in FIG. 2 but nevertheless high enough. In addition, the thickness Wm of the permanent magnet 23 is relatively less in the second embodiment. Thus, when using costly rare earth magnets as the magnetic material, the permanent magnets 23 of the second aspect can be used to reduce the amount of magnetic material used and increase cost-efficiency.

In contrast, the configuration of the permanent magnets 23 in the comparative example shown in FIG. 5 is an aspect in which the thickness Wm of the permanent magnet 23 is further increased from the first aspect shown in FIG. 3. As shown in the graphs of FIGS. 6 and 7, this aspect increases the thickness Wm of the permanent magnet 23 by an extremely large amount. Thus, even though it is for an IPM type, the surface area Sm is less than the SPM magnet surface area (IPM magnet surface area/SPM magnet surface area<1.0), and the output torque is less than the SPM type (magnetic torque<1). An IPM type increases the output torque from the conventional SPM type. However, the above extreme configuration of the permanent magnets 23 results in the output torque being lower than the SPM type and renders the IPM type ineffective.

Figure 8:
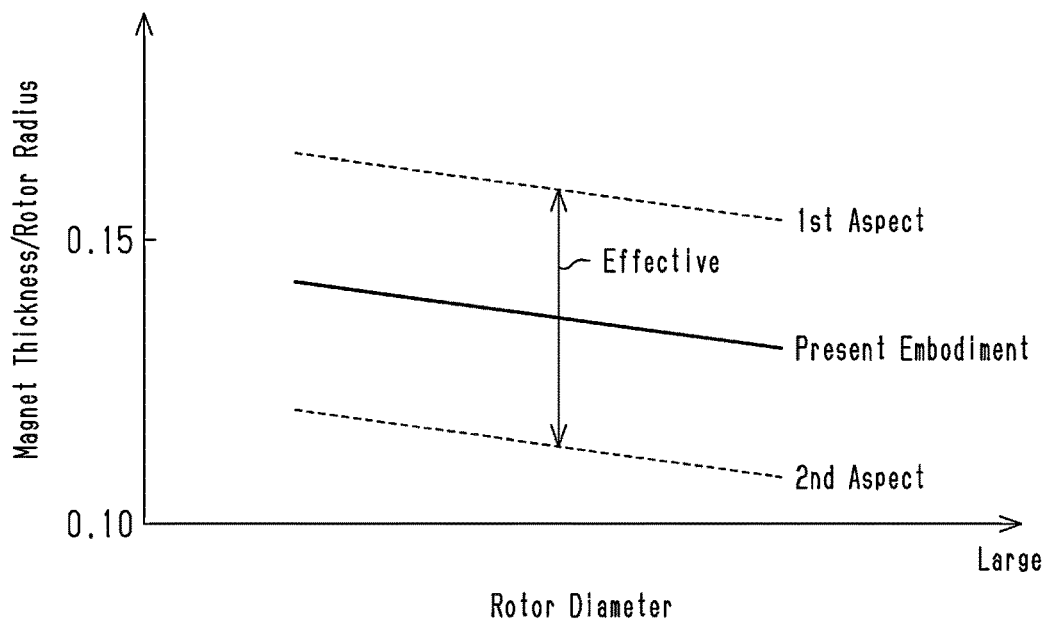
FIG. 8 is a graph showing the correlation of the permanent magnet thickness and the rotor diameter.

Further, as shown in FIG. 8, the inventors of the present invention have conducted studies on the correlation of the thickness Wm of the permanent magnet 23 to the diameter D of the rotor core 22 (magnet thickness/rotor radium).

The relationship of the thickness Wm of the permanent magnet 23 of the present embodiment and the diameter D of the rotor core 22 can be represented by expression (a), which is shown below.

$$Wm/(D/2) = -0.0006D + 0.1626 \quad \text{(a)}$$

When including the preferred first and second embodiments, the suitable range represented by expression (b) is obtained as shown below.

$$Wm/(D/2) = -0.0006D + 0.1626 \pm 0.5/(D/2) \quad \text{(b)}$$

That is, expression (c), which is shown below, is obtained.

$$-0.0006D + 0.1626 - 0.5/(D/2) \leq \quad \text{(c)}$$
$$Wm/(D/2) \leq -0.0006D + 0.1626 + 0.5/(D/2)$$

Thus, in accordance with the specification of the rotating electrical machine M, the thickness Wm of the permanent magnet 23 that is suitable for the diameter D of the rotor core 22 can be readily set using expression (c).

Figure 9:
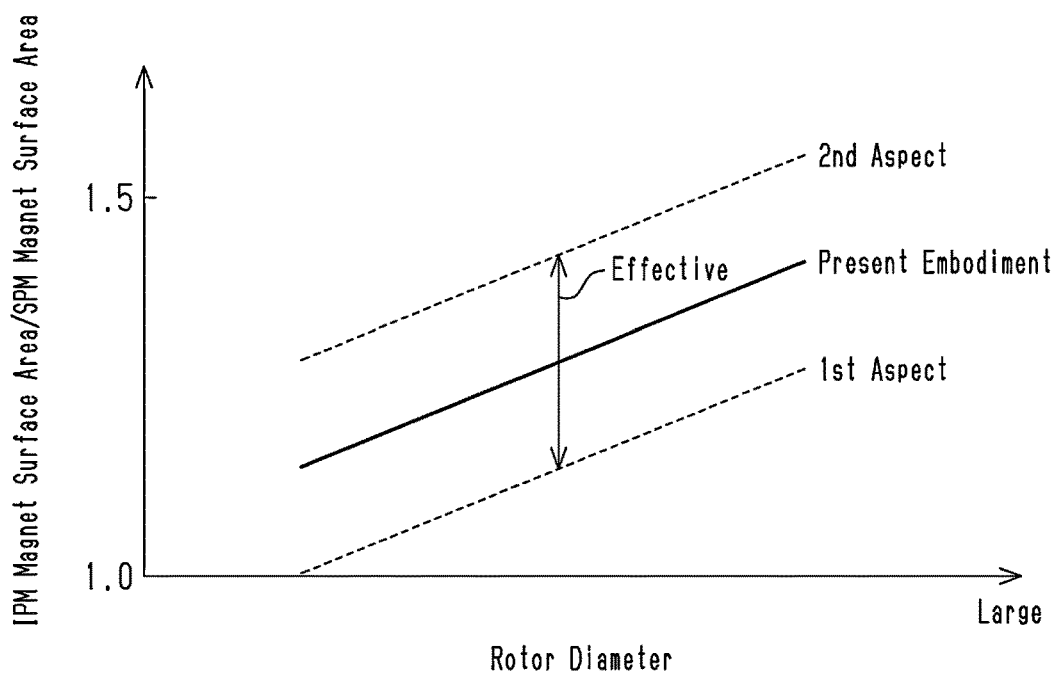
FIG. 9 is a graph showing the correlation of the permanent magnet surface area and the rotor diameter.

As shown in FIG. 9, the correlation of the surface area Sm of the permanent magnet 23 (IPM magnet surface area/SPM magnet surface area) to the diameter D of the rotor core 22 was studied.

The relationship of the surface area Sm of the inner magnet surface 23a of the permanent magnet 23 of the present embodiment and the diameter D of the rotor core 22 can be represented by expression (d), which is shown below.

$$Sm/(\pi DL/2P) = 0.0148D + 0.6919 \quad \text{(d)}$$

As described above, "D" and "L" represents the diameter D and the axial length L of the rotor 20 (rotor core 22), and "P" represents the pole pair number P of the rotor 20.

When including the preferred first and second embodiments, the suitable range expressed by expression (e) is obtained as shown below.

$$Sm/(\pi DL/2P) = 0.0148D + 0.6919 \pm 19.87/\pi D \quad \text{(e)}$$

That is, expression (f), which is shown below, is obtained.

$$0.0148D + 0.6919 - 19.87/\pi D \leq \quad \text{(f)}$$
$$Sm/(\pi DL/2P) \leq 0.0148D + 0.6919 + 19.87/\pi D$$

Thus, in accordance with the specification of the rotating electrical machine M, the surface area Sm of the inner magnet surface 23a of the permanent magnet 23 that is suitable for the diameter D of the rotor core 22 can be readily set using expression (f).

In the present embodiment, the shape of the permanent magnets 23 of the IPM rotor 20 is set in this manner. In other words, in the present embodiment, the shape of the magnet accommodation cavities 24 of the rotor core 22, which also function as molds for injection-molding magnetic material to form the permanent magnets 23, is formed in this manner.

The advantages of the present embodiment will now be described.

(1) In the rotor 20 in which the permanent magnets 23, each extending continuously and having a bent portion located toward the radially inner side of the rotor core 22, are embedded in the magnet accommodation cavities 24, the permanent magnets 23 are formed so that the thickness Wm satisfies expression (c). As a result, the rotor 20 generates sufficient magnetic torque. Further, sufficient magnetic torque can be easily generated by forming the permanent magnets 23 so that the thickness Wm satisfies expression (c).

(2) In the rotor 20, each permanent magnet 23 is formed so that the surface area Sm of the portion opposing the outer core portion 25 satisfies expression (f). As a result, the rotor 20 generates sufficient magnetic torque. Further, sufficient magnetic torque is generated by forming the permanent magnets 23 so that the surface area Sm satisfies expression (f). When the thickness Wm of the permanent magnet 23 satisfies expression (c), sufficient magnetic torque can be generated.

The present embodiment can be modified as described below. The present embodiment and the following modifications can be combined as long as the combined modifications remain technically consistent with each other.

The permanent magnets 23 use samarium-iron-nitrogen (SmFeN) magnet but may use other rare earth magnets, ferrites, or the like.

The permanent magnets 23 are bonded magnets but may be sintered magnets or the like.

The permanent magnets 23 are formed by filling the magnet accommodation cavities 24 of the rotor core 22 with magnetic material, solidifying the magnetic material, and then magnetizing the magnetic material. Instead, permanent magnets 23 that have been solidified and magnetized may be inserted and fixed to the magnet accommodation cavities 24 of the rotor core 22.

The shape of the permanent magnets 23 may be changed. Each permanent magnet 23 is generally V-shaped and formed to be bent and extend continuously but may be U-shaped instead. Further, the bent portion inner surface 33a and the bent portion outer surface 33b of the bent portion 33 each have the form of an ellipse but may have the form of a true circle or the form of other curved shapes. Further, the bent portion inner surface 33a and the bent portion outer surface 33b are elliptical and share the same center but may have the form of curved shapes having different centers.

The rotor core 22 is formed by stacking electromagnetic steel plates but may have a different structure. For example, the rotor core 22 may be formed by sintering magnetic powder.

In the same manner, the stator core 11, which is formed by stacking electromagnetic steel plates, may have a different structure. For example, the stator core 11 may be formed by sintering magnetic powder.

The number of pole pairs of the rotor 20 and the stator 10 may be changed.

The N-pole and S-pole of the rotor 20 shown in FIG. 1 and the U-phase, the V-phase, and the W-phase of the stator 10 shown in FIG. 1 are examples and may be changed.

The present disclosure is illustrated through the embodiment. However, the present disclosure is not limited to the structure of the embodiment. The present disclosure includes various modified examples and modifications within the scope of equivalence. Additionally, various combinations and modes and one, more, or less of these elements in other combinations and forms are included in the range and conceptual scope of the present disclosure.

Technical concepts that can be recognized from the above embodiments and modified examples will now be described.

(A) A rotor (20) including:
a rotor core (22) having a magnet accommodation cavity (24); and
a permanent magnet (23) embedded in the magnet accommodation cavity of the rotor core, the permanent magnet including a bent portion located toward a radially inner side of the rotor core, where
the permanent magnet that generates magnetic torque and an outer core portion (25) that generates reluctance torque and is located radially outward from the permanent magnet in the rotor core are formed to satisfy an expression of $$-0.0006D + 0.1626 - 0.5/(D/2) \leq$$
$$Wm/(D/2) \leq -0.0006D + 0.1626 + 0.5/(D/2)$$

where Wm represents a thickness of the permanent magnet, and D/2 represents a radius of the rotor core, and satisfy an expression of $$0.0148D + 0.6919 - 19.87/\pi D \leq$$
$$Sm/(\pi DL/2P) \leq 0.0148D + 0.6919 + 19.87/\pi D$$

where Sm represents a surface area of a portion of the permanent magnet opposing the outer core portion, D represents a diameter of the rotor core, L represents an axial length of the rotor core, and P represents a number of pole pairs of the rotor.

(B) A rotating electrical machine including:
the rotor (20) according to any one of claim 1, claim 2, and concept (A); and
a stator (10) that rotatably accommodates the rotor in an open space extending radially inward and is formed to generate a rotating magnetic field that rotates the rotor when a coil (13) is energized.

DESCRIPTION OF REFERENCE CHARACTERS

20) rotor, 22) rotor core, 23) permanent magnet, 24) magnet accommodation cavity, 25) outer core portion, Wm) thickness, Sm) surface area, D/2) radius, D) diameter, L) axial length, P) pole pair number

What is claimed is:
1. A rotating electrical machine comprising:
   a rotor including:
      a rotor core having magnet accommodation cavities; and
      eight permanent magnets embedded in the magnet accommodation cavities of the rotor core, respectively, the permanent magnets each including a bent portion located toward a radially inner side of the rotor core, the permanent magnets generating magnetic torque, an outer core portion located radially outward from the permanent magnets in the rotor core and generating reluctance torque; and
   a stator including:
      a stator core having twelve teeth, the teeth arranged along a circumferential direction and each extending toward the rotor; and
      coils wound around the teeth, respectively, in a concentrated manner, wherein
   in a single rotor magnetic pole including a permanent magnet and the outer core portion located radially outward from the permanent magnet, a surface area of a portion of the permanent magnet opposing the outer core portion is larger than and smaller than 1.5 times an area of an outer circumferential surface of the rotor core allocated for the single rotor magnetic pole.

2. A method for manufacturing the rotating electrical machine according to claim 1, the method comprising:
   filling the magnet accommodation cavities of the rotor core with a magnetic material of the permanent magnet and magnetizing the permanent magnet that has been solidified.

* * * * *